United States Patent

Liposky

[15] 3,678,959

[45] July 25, 1972

[54] HAND OPERABLE SELECTOR VALVE

[72] Inventor: Richard B. Liposky, 69 Dwellington Drive R.D. #3, Valencia, Pa. 16059

[22] Filed: July 30, 1970

[21] Appl. No.: 59,468

[52] U.S. Cl. ..................... 137/625.11, 137/625.4, 251/282, 251/325
[51] Int. Cl. ....................................... F16k 3/00, F16k 11/06
[58] Field of Search .................... 137/625.11, 625.4, 625.48, 137/607, 609, 610, 625.68; 251/319, 282, 325

[56] References Cited

UNITED STATES PATENTS

| | | | |
|---|---|---|---|
| 2,986,165 | 5/1961 | Hogan | 251/282 X |
| 3,200,846 | 8/1965 | Beck | 251/325 X |
| 2,252,141 | 8/1941 | Seidel et al. | 137/625.48 |
| 2,858,851 | 11/1958 | Holl | 251/1319 |
| 2,980,137 | 4/1961 | Selwood | 251/319 |
| 2,998,828 | 9/1961 | Hare | 137/625.68 |
| 3,162,210 | 12/1964 | Bemis | 137/625.11 X |
| 3,521,674 | 7/1970 | Dodson et al. | 137/625.48 |

Primary Examiner—William R. Cline
Attorney—Clarence A. O'Brien, Harvey B. Jacobson and Richard V. Westerhoff

[57] ABSTRACT

A tubular casing having a longitudinally extending passageway therein receives a valving member. Three inlet ports are formed along one side of the casing. An identical number of orifices are formed in a confronting face of the valving member. The spacing between orifices is such that only one of the inlet ports communicates with a respective orifice in any particular position. The central portion of the valving member includes a chamber which communicates with the orifices. A plurality of orifices are formed along an oppositely disposed face of the valving member in relation to an outlet port. Thus, in any particular position of the valving member selective communication between one of the inlet ports and the outlet port can be effected.

10 Claims, 6 Drawing Figures

Patented July 25, 1972
3,678,959
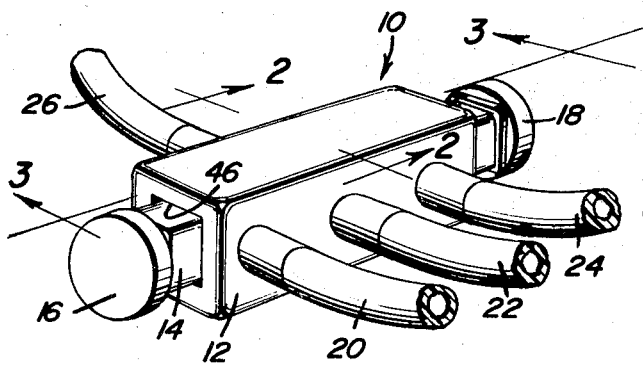
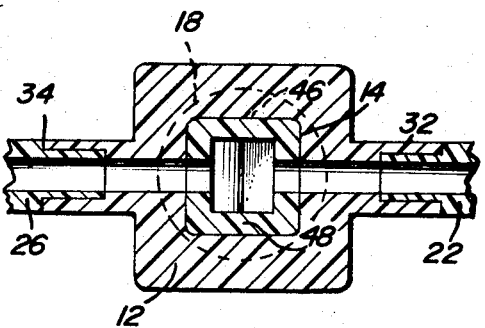
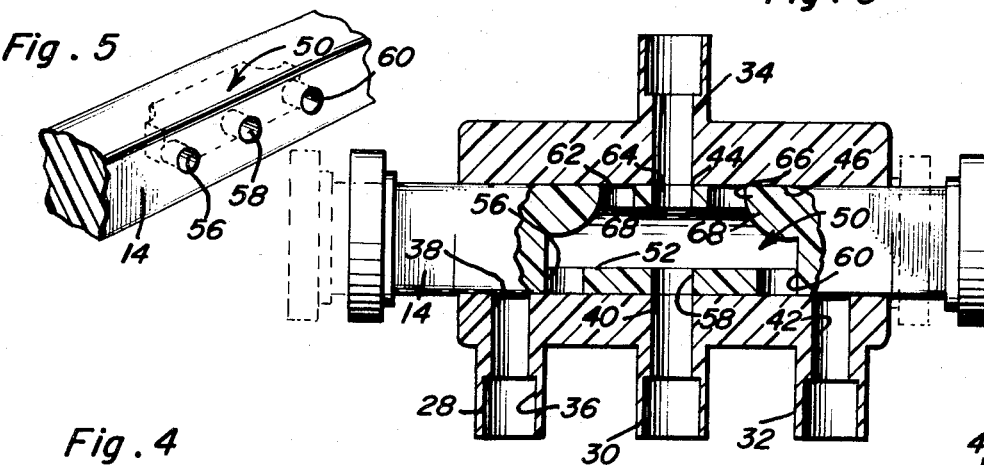
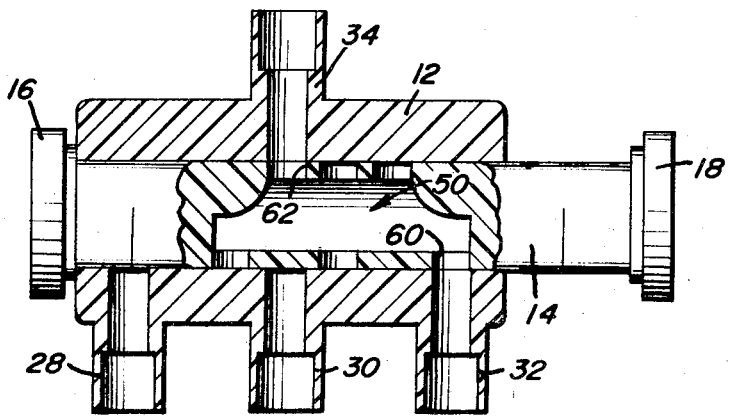
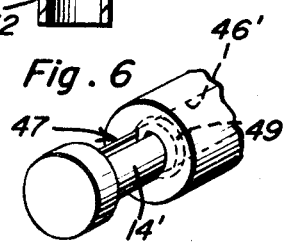
Richard B. Liposky
INVENTOR.

HAND OPERABLE SELECTOR VALVE

The present invention relates to a multiple selection valve particularly suited for use in intravenous administration.

During the present time, efficiency in intravenous administration is reduced by the fact that different intervaneous fluids must be introduced into a patient's veins by individual injections. This is undesirable, particularly during a surgical operation since time is of the essence and precise timing of intravenous fluid administration is mandatory.

The prior art includes several multiple selection valves that include a plurality of inlet lines connected to various intravenous fluids while a single outlet line is connected to a needle that introduces the fluids into the patient's blood stream. By changing the position of a valving member, a selected inlet line can be made operational. Then, if a subsequent fluid is to be introduced, the valving member is positioned to the proper location to effect flow of the appropriate subsequent intravenous fluid. Generally, these prior art constructions have included springs and other mechanical positioning means which decrease the reliability of the unit. Further, prior intricate valve designs have been costly to fabricate and must therefore be re-used. This introduces the danger of infecting a subsequent patient with harmful organisms existing in the blood of a previous patient. Further, if a valve is to be re-used, it must be carefully cleaned which requires the expenditure of unnecessary time and labor.

The present invention is directed to a simply constructed disposable multiple selection valve which is easily and inexpensively fabricated thereby making possible disposal of the unit after each use. The valving member of the present invention is simply a sliding component that is easily changed from one position to another with the use of only one hand. The invention enables a doctor or other qualified attendant to selectively choose one of three intravenous fluids for introduction into the patient's blood stream.

Although the preceding discussion is directed to the utilization of the invention for intravenous procedures, its applicability is much wider. For example, as a medical monitoring device, acoustical transducers such as a stethoscope chest piece can be connected to each of the inlet ports and placed against various parts of a patient's body to monitor different parameters on a selective basis. At the outer end of the outlet port, an earpiece can be connected for insertion into a doctor's ear. Then, by selectively switching the valving member, blood pulsations from one of the stethoscope chest pieces can be heard. Thus, in effect, the valve member utilized in this mode serves as an acoustical monitor.

Likewise, pressure transducers can be substituted for the stethoscope chest piece. Accordingly by selective positioning of the valving member, blood pressure at different parts of the body can be monitored. In this mode, the valving member serves as a fluid valve.

Therefore, the present invention will be seen to have wide application in the medical field particularly for the purposes of regulating flow or monitoring vital physiological parameters. It should be noted that a suitable clip or fastener can be connected to the tubular casing of the present valve so that the valve may be carried on the medical practitioner's clothing.

If an earpiece is employed to monitor acoustical parameters as hereinbefore described, the individual utilizing such earpiece only has a single ear affected so that he is still aware of an operating room environment.

Still further, the present invention can be utilized in industrial applications. For example, the valve mechanism can be used to control mixtures of liquids, solid materials, and gases, the latter being possible with suitable inclusion of gas seals.

The valve device set forth herein can also be employed in fire control by having a fire suppressant applied directly into flammable source lines.

Still further, another industrial use of the present valve resides in its capability of selective withdrawal of fluids from a tank reservoir.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIG. 1 is a perspective view of the present invention.

FIG. 2 is a transverse sectional view taken along a plane passing through section line 2—2 of FIG. 1.

FIG. 3 is a longitudinal sectional view taken along a plane passing through section line 3—3 of FIG. 1.

FIG. 4 is a view similar to that of FIG. 3 with the valving member illustrated in a different position than that shown in FIG. 3.

FIG. 5 is a partial perspective view illustrating the external appearance of the valving member.

FIG. 6 is a partial perspective view illustrating a modification of the present invention.

Referring to the figures and more particularly FIG. 1, reference numeral 10 generally indicates the present invention as hooked up to inlet lines and an outlet line. The device includes a tubular casing 12 preferably manufactured from a plastic material. A valving member 14 is longitudinally slidable within the casing and by varying the position of the valving member, a selected one of the inlet lines 20, 22 and 24 can be made to communicate with the outlet line 26. In order to facilitate the switching or repositioning of the valving member, buttons 16 and 18 are suitably fastened to the transverse ends of the valving member 14.

Reference is made to FIG. 3 wherein the specific structure of the present valve is illustrated. Inlet ports in the form of cylindrical nipples 28, 30 and 32 extend laterally outwardly from a first side of the valve casing. An outlet port in the form of an outwardly extending cylindrical nipple 34 extends from an oppositely disposed side of the casing. Considering the inlet port nipple 28 as being typical, the interior of the nipple is seen to include a passageway having an enlarged portion 36 which extends inwardly to a stepped-down portion 38 which communicates with the interior of the casing. Similar inlet openings 40 and 42 are respectively associated with the inlet port nipples 30 and 32. A stepped-down passageway extends inwardly through the outlet port 34 and terminates in an opening 44 that is positioned in aligned oppositely disposed relation to the aforementioned opening 40. As clearly illustrated in FIG. 2, the interior of the tubular casing 12 is characterized by an axially extending passageway 46 having a square cross-section. The body of the valving member 14, as shown in FIGS. 2 and 5, also has a square-shaped cross-section 48 and is dimensioned to effect intimate sliding engagement with the passageway 46. By making the valving member 14 and its associated passageway 46 non-cylindrical, rotation between these parts is impossible and therefore the required alignment between the valving member and the casing can be ensured. Viewing FIG. 6, it should be emphasized that a right cylindrical member 14' and a mating cylindrical passageway 46' can be employed instead. This typically requires utilization of a conventional keying configuration 47 to prevent rotation of the member 14'. O-rings 49 are installed on the outward ends of the valving member to prevent leakage.

Referring to FIGS. 3 and 5, a chamber generally indicated by reference numeral 50 is seen to be formed in the center of the valving member 14. A first lateral boundary 52 (FIG. 3) of the chamber 50 communicates with three parallel spaced orifices 56, 58 and 60. The spacing between these orifices is designed to effect communication, at any given position, between only one inlet port and its associated orifice. Thus, in FIG. 3, by centrally positioning the valving member 14, communication is obtained between the inlet port 30 and its associated orifice 58. This communication is of course extended to the chamber 50. In the position shown in FIG. 3, the remaining orifices 56 and 60 are sealed against the interior wall of the casing passageway 46 so that they are not operational in this position of the valving member 14.

Orifices 62, 64 and 66 are formed in an opposite side of the valving member 14. The orifices are positioned in parallel spaced relation and the space between them is designed to allow only one of these orifices to communicate with the outlet port 34 while an associated one of the orifices 56, 58 and 60 is in communication with one of the inlet ports. Thus, in FIG. 3, orifice 64 is positioned in registry with the outlet port 34 thereby completing a communication path including inlet port 30, orifice 58, chamber 50, orifice 64 and outlet port 34.

As will be noted from FIG. 3, the orifices 62 and 66 remain sealed against the interior wall of the casing passageway 46 while the orifice 64 is in communicating registry with the outlet port 34. Thus, only the orifice 64 of the orifice group 62, 64 and 66 is operational in the depicted position.

Referring to FIG. 4, a second position of the valving member 14 is illustrated. As will be noted, the valving member 14 has been repositioned from a central location as illustrated in FIG. 3 to a right position. The result of this displacement of the valving member 14 is that communication now only takes place between inlet port 32 and outlet port 34 through the interposed communication path including orifice 60, chamber 50 and orifice 62.

As clearly illustrated in FIGS. 3 and 4, the transverse walls of the chamber 50 include rounded surfaces 68. These rounded surfaces produce an inwardly tapering chamber in the direction from inlet port to outlet port. The rounded surfaces serve to smooth the flow between a selected inlet port and the outlet port.

Although the preferred embodiment of the present invention has been described in terms of a valving member having three inlet ports and a single outlet port, it should be appreciated that the direction of flow can be reversed so that a distribution from a single source is possible and the following claims envision this equivalent reversal. Further, these claims are not intended to be restricted to any particular medium being regulated by the valve. Accordingly, selection between inlet and outlet sources may be had with liquids, gases or acoustical transmission.

The invention may also include detent means or the like to selectively lock the valving member in a chosen position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hand operable selector valve comprising an elongated casing having a longitudinal passageway therethrough and a plurality of ports including two longitudinally displaced inlet ports and one outlet port each communicating with the longitudinal passageway; and an elongated valving member in sliding and sealing engagement with the surface of the longitudinal passageway, said valving member being provided with a common longitudinal central chamber and with a plurality of transverse passageways each communicating with the central chamber including two longitudinally displaced transverse passageways, said valving member being provided with stops to limit the travel of the valving member in either longitudinal direction, the longitudinal spacing of the inlet ports and the two longitudinally displaced transverse passageways being such that only a first of said inlet ports and a first of said transverse passageways will be in alignment to complete a path between the first inlet port and the central chamber when the valving member is in its first limit position, and only the second inlet port and the second transverse passageway are in alignment to complete the path between the second inlet port and the central chamber when the valving member is in the second limit position, said outlet port being in alignment with a transverse passageway to complete a path between the central chamber and the outlet port for each limit position of the valving member whereby a positive selection of a path between a selected one of the inlet ports and the outlet port can be made by sliding the valving member to the selected limit position.

2. The selector valve of claim 1 wherein the longitudinal passageway in the casing is of uniform cross-section substantially throughout its length and the valving member is of corresponding uniform cross-section substantially throughout its length with the length of said valving member exceeding that of said longitudinal passageway such that the valving member extends beyond the ends of the casing for all valving positions, and wherein the limit means include transverse projections on the valving member on either side of the casing which strike the casing to limit the travel of the valving member at the limit positions.

3. The selector valve of claim 1 including a third inlet port and a third longitudinally displaced transverse passageway, the spacing of said third port and transverse passageway being such that for an intermediate position of the valving member only the third inlet port and the third longitudinally displaced transverse passageway are in alignment to form a path between the third inlet port and the central chamber, said outlet port being aligned with a transverse passageway to complete the path between the third inlet port and the outlet port when the valving member is in said intermediate position.

4. The selector valve of claim 3 including detent means for locating and locking the valving member in said intermediate position.

5. The selector valve of claim 1 wherein the confronting orifices of the inlet ports and the cooperating transverse passageways are of corresponding cross-section and wherein the difference in the longitudinal spacing of the inlet ports and the longitudinal spacing of the cooperating transverse passageways is between one end two times the longitudinal dimension of said orifices.

6. A selector valve comprising an elongated casing having a longitudinal passageway therethrough and a plurality of ports including three longitudinally aligned inlet ports and an outlet port each communicating with the longitudinal passageway; said selector valve also comprising an elongated valving member in sliding and sealing engagement with the surface of the longitudinal passageway in the casing, said valving member being provided with a common longitudinal central chamber and a plurality of transverse passageways each communicating with the central chamber, said transverse passageways including three longitudinally aligned inlet passageways for cooperating with the inlet ports, the longitudinal spacing of the three inlet passageways being less than the longitudinal spacing of the three inlet ports by an amount equal to between one-half and one times the sum of the longitudinal dimension of an inlet port plus the longitudinal dimension of an inlet passageway such that one and only one inlet passageway will be fully aligned with its corresponding inlet port at a time, yet for all positions of the valving member there will always be at least partial communication between an inlet port and the central chamber through one of the inlet passageways, said outlet port being in at least partial alignment with a transverse passageway for all positions of the sliding valving member to complete a flow path between the outlet port and the inlet ports through the central chamber, and locating means for locating the three positions of the valving means at which each of the three inlet passageways is fully aligned with its corresponding inlet port.

7. The selector valve of claim 6 wherein the confronting orifices of the inlet ports and the inlet passageways are all of equal circular cross-section such that the longitudinal spacing of the three inlet passageways is less than that of the inlet ports by an amount equal to one to two times the common diameter.

8. The selector valve of claim 7 wherein the outlet port is longitudinally aligned between the end inlet ports on the opposite side of the casing from the inlet ports and wherein the ends of the longitudinal central chamber in the valving member converge toward the outlet port thereby minimizing the volume of the central chamber and smoothing the flow from the inlet ports to the outlet port.

9. The selector valve of claim 8 wherein the plurality of transverse passageways includes three longitudinally aligned outlet passageways of circular cross-section for cooperating with the outlet port, the longitudinal spacing between centers of said outlet passageways being less than twice the diameter of said outlet passageways.

10. The selector valve of claim 9 wherein the longitudinal passageway in the casing and the valving member are quadrilateral in cross-section and wherein the inlet ports and passageways are on opposite faces of the quadrilaterals from the outlet port and outlet passageways.

* * * * *